(12) United States Patent
Malrait et al.

(10) Patent No.: US 9,639,795 B2
(45) Date of Patent: May 2, 2017

(54) METHOD AND SYSTEM FOR DISPLAYING AT LEAST ONE MATRIX CODE ON A SCREEN TO SEND DATA TO ELECTRONIC EQUIPMENT PROVIDED WITH MEANS FOR READING THE MATRIX CODE(S)

(71) Applicant: SCHNEIDER TOSHIBA INVERTER EUROPE SAS, Pacy-sur-Eure (FR)

(72) Inventors: Francois Malrait, Jouy sur Eure (FR); Marc Geneau, Fresney (FR)

(73) Assignee: SCHNEIDER TOSHIBA INVERTER EUROPE SAS, Pacy sur Eure (FR)

( * ) Notice: Subject to any disclaimer, the term of this patent is extended or adjusted under 35 U.S.C. 154(b) by 0 days.

(21) Appl. No.: 14/392,133

(22) PCT Filed: Jun. 23, 2014

(86) PCT No.: PCT/EP2014/063146
§ 371 (c)(1),
(2) Date: Dec. 23, 2015

(87) PCT Pub. No.: WO2014/206930
PCT Pub. Date: Dec. 31, 2014

(65) Prior Publication Data
US 2016/0292555 A1    Oct. 6, 2016

(30) Foreign Application Priority Data
Jun. 24, 2013    (FR) ...................................... 13 55998

(51) Int. Cl.
G06K 19/06    (2006.01)
G06T 11/60    (2006.01)
G06K 7/14    (2006.01)

(52) U.S. Cl.
CPC ...... *G06K 19/06037* (2013.01); *G06K 7/1417* (2013.01); *G06K 19/06112* (2013.01); *G06T 11/60* (2013.01)

(58) Field of Classification Search
CPC ....................... G06K 19/06037; G06K 7/1417
See application file for complete search history.

(56) References Cited

U.S. PATENT DOCUMENTS

| 2004/0012569 A1* | 1/2004 | Hara | ....................... G06K 1/121 345/169 |
| 2008/0122847 A1* | 5/2008 | Takano | ................. G06T 3/4092 345/428 |

OTHER PUBLICATIONS

"ISO/IEC 18004:2006 Information technology—Automatic identification and data capture techniques—QR Code 2005 bar code symbology specification", International Standard, vol. 18004. Total 122 Pages, (Sep. 2006), XP009136090.

(Continued)

*Primary Examiner* — Kristy A Haupt
(74) *Attorney, Agent, or Firm* — Oblon, McCleland, Maier & Neustadt, L.L.P.

(57) ABSTRACT

A display method displays at least one matrix code on a screen of an electronic display device, to send data to electronic equipment including a mechanism reading the matrix code. The display device includes the screen and a mechanism displaying information on the screen. The display method includes: generating at least one two-dimensional matrix code from data to be sent; displaying the matrix code on the screen, matrix codes being displayed successively when plural matrix codes are generated; partitioning a primary image corresponding to a generated matrix code into at least two secondary images, dimensions of the primary image being equal to dimensions of the matrix code and dimensions of the secondary image being smaller than or equal to resolution of the screen, the corresponding matrix (Continued)

code being displayed as secondary images during the display, and the secondary images being displayed successively on the screen.

13 Claims, 4 Drawing Sheets

(56) References Cited

OTHER PUBLICATIONS

International Search Report Issued Aug. 28, 2014 in PCT/EP14/063146 Filed Jun. 23, 2014.
French Search Report Issued Feb. 7, 2014 in French Application 1355998 Filed Jun. 24, 2013.

* cited by examiner

METHOD AND SYSTEM FOR DISPLAYING AT LEAST ONE MATRIX CODE ON A SCREEN TO SEND DATA TO ELECTRONIC EQUIPMENT PROVIDED WITH MEANS FOR READING THE MATRIX CODE(S)

FIELD OF THE INVENTION

The present invention relates to a method for displaying at least one matrix code on a screen of an electronic display device to send data to electronic equipment provided with reading unit for reading the matrix code(s). The display device comprises the screen and a display unit for displaying information on the screen.

The method includes generating at least one two-dimensional matrix code from the data to be sent, and displaying the matrix code(s) on the screen, the matrix codes being displayed successively when a plurality of matrix codes are generated.

The invention also relates to a system for displaying at least one matrix code on a screen to send data to electronic equipment provided with the reading unit.

BACKGROUND OF THE INVENTION

A plurality of types of two-dimensional matrix codes, also referred to as QR (Quick Response) codes, exist and the quantity of data capable of being encoded in the form of a QR code depends on the size of said QR code. The QR code is a two-dimensional code, and its size is expressed in the form of a product of two numbers of pixels, each number corresponding to a respective dimension. The larger the size of the matrix code, the greater the quantity of encoded data. In other words, the larger the size of the matrix code, the greater the quantity of data sent via the display of said matrix code to the equipment provided with the reading unit.

The screen is disposed in a plane comprising a horizontal direction and a vertical direction and has a predetermined resolution, i.e. a maximum number of pixels displayable in the horizontal direction multiplied by a maximum number of pixels displayable in the vertical direction. The size of the matrix code is then limited by the resolution of the screen of the display device, since it must be less than this resolution of the screen so that the matrix code can be displayed on the screen.

Furthermore, the resolution is generally variable from one display device to another, and when the same matrix code must be displayable on different display devices having different resolution values, the type of matrix code chosen to send the data will necessarily have a size less than the lowest resolution among said display devices. It will then generally be necessary to display a large number of matrix codes successively in order to send all the data to the equipment provided with the reading unit.

SUMMARY OF THE INVENTION

The object of the invention is therefore to propose a method for displaying a matrix code on a screen allowing the quantity of data sent to the equipment via the display of the matrix code(s) to be optimized according to the resolution of the screen.

For this purpose, the subject-matter of the invention is a display method of the aforementioned type wherein the method furthermore includes the partitioning of a primary image corresponding to a generated matrix code into at least two secondary images, the dimensions of the primary image being equal to the dimensions of said matrix code and the dimensions of each secondary image being smaller than or equal to the resolution of the screen of the display device, the corresponding matrix code(s) being displayed in the form of the secondary images during the display and the secondary images being displayed successively on the screen.

According to other advantageous aspects of the invention, the display method includes one or more of the following features, taken in isolation or according to all technically possible combinations:

the number of secondary images for each matrix code is a function of the resolution of the screen of the display device and the dimensions of said matrix code;

the resolution of the screen and the matrix code each have a dimension in a horizontal direction, and the number Nx of secondary images in the horizontal direction verifies the following equation:

$$Nx = \begin{cases} E\left(\dfrac{L1x}{L2x}\right), & si\dfrac{L1x}{L2x} - E\left(\dfrac{L1x}{L2x}\right) = 0 \\ E\left(\dfrac{L1x}{L2x}\right) + 1, & si\dfrac{L1x}{L2x} - E\left(\dfrac{L1x}{L2x}\right) > 0 \end{cases},$$

where L1x represents the dimension of the matrix code in the horizontal direction and L2x represents the dimension of the resolution of the screen in the horizontal direction, and E denotes the integer part;

the resolution of the screen and the matrix code each have a dimension in a vertical direction, and the number Ny of secondary images in the vertical direction verifies the following equation:

$$Ny = \begin{cases} E\left(\dfrac{L1y}{L2y}\right), & si\dfrac{L1y}{L2y} - E\left(\dfrac{L1y}{L2y}\right) = 0 \\ E\left(\dfrac{L1y}{L2y}\right) + 1, & si\dfrac{L1y}{L2y} - E\left(\dfrac{L1y}{L2y}\right) > 0 \end{cases}$$

where L1y represents the dimension of the matrix code in the vertical direction and L2y represents the dimension of the resolution of the screen in the vertical direction, and E denotes the integer part;

the number N of secondary images for each matrix code verifies the following equation:

$N = Nx \times Ny;$ each matrix code complies with the ISO/IEC 18004 standard;

the data to be sent are received from a remote electronic device, different from the display device and connected to the display device via a data link;

the remote electronic device comprises a generation unit for generating at least one two-dimensional matrix code from the data to be sent and a partitioning unit for partitioning a primary image corresponding to a generated matrix code into at least two secondary images, wherein the generation and partitioning are carried out by said generation unit and by said partitioning unit respectively;

during the partitioning, the primary image is partitioned into a plurality of pieces and the pieces are each surrounded by a frame, each secondary image then comprising a corresponding piece of the primary image, surrounded by said frame;

during the partitioning step, the primary image is partitioned into a plurality of pieces and the pieces are each surrounded by a frame, each secondary image then comprising a corresponding piece of the primary image, surrounded by said frame;

each frame is in the form of a group of lines containing encoded information.

The subject-matter of the invention is also a system for displaying at least one matrix code on a screen to send data to electronic equipment provided with a reading unit for reading the matrix code(s), the system including:

at least one electronic display device comprising the screen and a display unit for displaying information on the screen, a generation unit for generating at least one two-dimensional matrix code from the data to be sent, and the display unit being capable of displaying the matrix code(s) on the screen, the matrix codes being displayed successively when a plurality of matrix codes are generated, wherein the system furthermore includes a partitioning unit for partitioning a primary image corresponding to a generated matrix code into at least two secondary images, the dimensions of the primary image being equal to the dimensions of said matrix code and the dimensions of each secondary image being less than or equal to the resolution of the screen of the corresponding display device, the corresponding matrix code(s) being displayed in the form of the secondary images by the display unit and the secondary images being displayed successively on the corresponding screen.

According to another advantageous aspect of the invention, the display screen includes the following feature:

The system furthermore includes a remote electronic device, different from the display device and connected to the or to each display device via a data link, the electronic device comprising a memory for storing the data to be sent, the data to be sent being received by the generation unit from the storage memory.

BRIEF DESCRIPTION OF THE DRAWINGS

These features and advantages of the invention will become apparent from a reading of the description which follows, given purely by way of a non-limiting example, with reference to the attached drawings, in which.

DETAILED DESCRIPTION OF PREFERRED EMBODIMENTS

Figure 1:
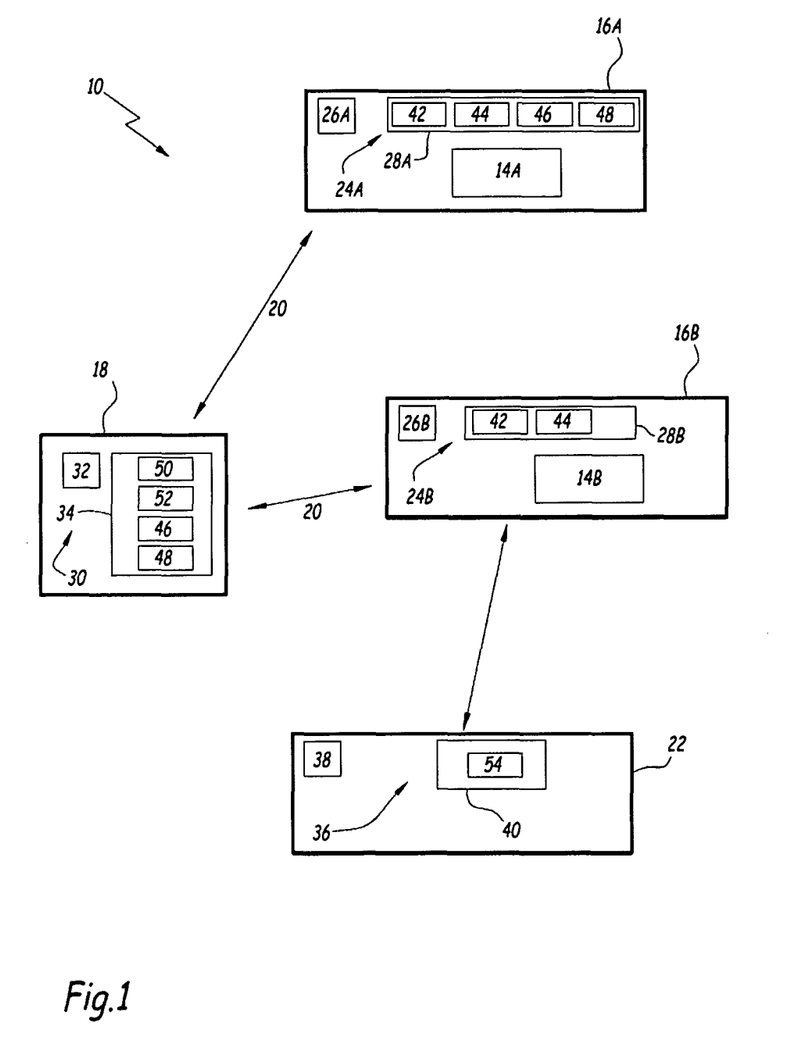
FIG. 1 is a schematic representation of a display system according to the invention, the display system including a plurality of electronic display devices and a remote electronic device connected to each display device via a respective data link, the electronic device comprising a memory for storing the data to be sent.

In FIG. 1, a system 10 for displaying at least one matrix code 12 on a respective screen 14A, 14B includes a plurality of electronic display devices 16A, 16B, i.e. a first display device 16A and a second display device 16B, and a remote electronic device 18, connected to each display device 16A, 16B via a respective data link 20.

FIG. 1 also shows electronic equipment 22 capable of reading the matrix code(s) 12 displayed on the screen 14A, 14B, each screen 14A, 14B being disposed in a plane comprising a horizontal direction X and a vertical direction Y.

Figure 3:
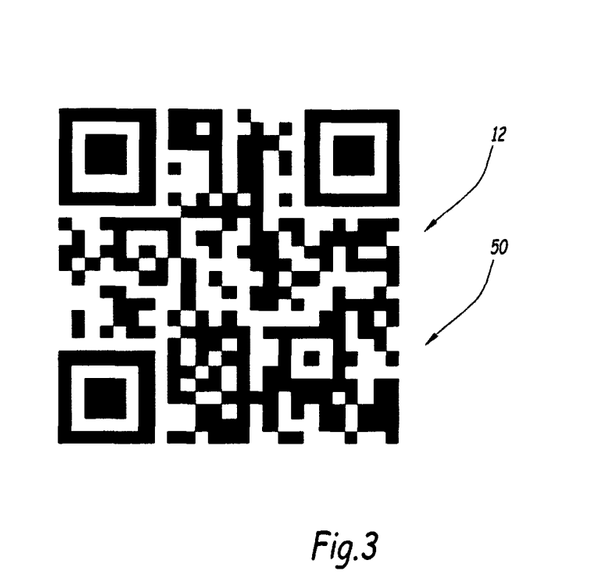
FIG. 3 is a view of a primary image of a matrix code.

The matrix code 12 shown in FIG. 3 is a two-dimensional matrix code, also referred to as a QR (Quick Response) code. The quantity of data capable of being encoded in the form of the QR code 12 depends on the size of said QR code 12. The size of the matrix code 12 is expressed in the form of a product of two numbers of pixels, each number corresponding to a respective dimension. Below, L1x will represent the dimension of the matrix code 12 in the horizontal direction X, and L1y will represent the dimension of the matrix code 12 in the vertical direction Y.

The larger the size of the matrix code 12, the greater the quantity of encoded data. In other words, the larger the size of the matrix code 12, the greater the quantity of data sent via the display of said matrix code 12 to the electronic equipment 22.

The matrix code 12 preferably complies with the ISO/IEC 18004 standard.

Each screen 14A, 14B has a predetermined resolution, i.e. a maximum number L2x of pixels displayable in the horizontal direction X multiplied by a maximum number L2y of pixels displayable in the vertical direction Y. In other words, L2x represents the dimension of the resolution of the screen 14A, 14B in the horizontal direction X, and L2y represents the dimension of the resolution of the screen 14A, 14B in the vertical direction Y.

In the example embodiment shown in FIG. 1, the first display screen 14A has a first resolution and the second display screen 14B has a second resolution different from the first resolution.

The first display device 16A includes the first display screen 14A. The first display device 16A also includes a first information processing unit 24A, formed, for example, from a first processor 26A and a first memory 28A associated with the first processor 26A.

The second display device 16B includes the second display screen 14B. The second display device 16B includes a second information processing unit 24B, formed, for example, from a second processor 26A and a second memory 28B associated with the second processor 26B.

The remote device 18 includes a third processing unit 30, formed, for example, from a third processor 32 and a third memory 34 associated with the third processor 32.

The remote device 18 is, for example, a speed variator. The speed variator is capable of controlling an electric motor and is used for different applications such as water treatment, electrical applications, the extraction and/or transportation of petroleum or gas, applications in metallurgy or in ore processing, or for applications relating to heating, ventilation and air conditioning, referred to as HVAC applications.

The data links 20 are, for example, radio links and the display devices 16A, 16B and the remote device 18 respectively each comprise a radio transceiver, not shown.

The electronic equipment 22 capable of reading the matrix codes 12 includes a fourth information processing unit 36, formed, for example, from a fourth processor 38 and a fourth memory 40 associated with the fourth processor 38.

The first memory 28A is capable of storing software 42 for displaying information on the screen 14A and software 44 for receiving, via the data link 20, data sent by the remote device 18.

The first memory 28A is also capable of storing software 46 for generating one or more two-dimensional matrix codes 12 from data to be sent to the electronic equipment 22, said data to be sent being, for example, received the reception software 44 from the remote device 18.

Figure 4:
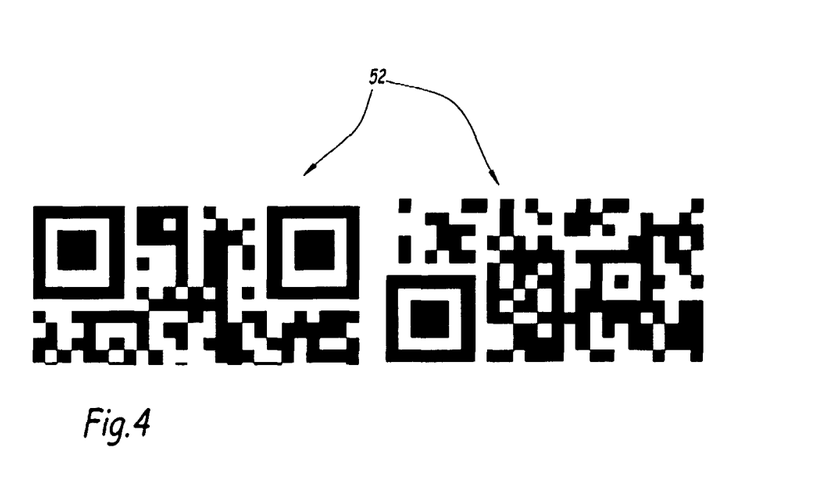
FIG. 4 is a view of the secondary images obtained following the partitioning of the primary image shown in FIG. 3 into two secondary images.

The first memory 28A is also capable of storing software 48 for partitioning a primary image 50 corresponding to a generated matrix code 12 (FIG. 3) into at least two secondary images 52 (FIG. 4), the dimensions of the primary image 50 being equal to the dimensions of said matrix code 12 and the dimensions of each secondary image 52 being less than or equal to the resolution of the screen 14A of the first display device.

Alternatively, the display unit 42, the reception unit 44, the generation unit 46 and the partitioning unit 48 are implemented in the form of programmable electronic components or in the form of dedicated integrated circuits.

The second memory 28B is capable of storing the display software 42, the display software 42 being capable of displaying information on the screen 14B, and the reception software 44. However, the second memory 28B comprises neither the generation software 46 nor the partitioning software 48.

In other words, in the example embodiment shown in FIG. 1, the second display device 16B has a capacity less than that of the first display device 16A since it comprises only the display unit 42 and the reception unit 44, but does not comprise the generation unit 46 or the partitioning unit 48, the generation of the matrix code(s) 12 and the partitioning of the primary image 50 into secondary images 52 then being carried out by the remote device 18, as will be described below.

The third memory 34, i.e. the memory of the remote device 18, is capable of storing the data to be sent to the electronic equipment 22. The third memory 34 is capable of storing software 50 for sending data via the data link 20 to a corresponding display device 16A, 16B.

In addition, the third memory 34 is capable of storing software 52 for determining the capacity of the display device(s) 16A, 16B connected to the remote device, the determination software 52 being notably capable of detecting the case where the capacity of a corresponding display device 16B is insufficient for generating one or more matrix codes 12 from received data and for partitioning the primary image 50 corresponding to each generated matrix code 12 into secondary images 52. The third image 34 is then also capable of storing the generation software 46 and the partitioning software 48.

The fourth memory 40, i.e. the memory of the electronic equipment 22 capable of reading the secondary images 52 displayed on the screen 14A, 14B and corresponding to the generated matrix code(s) is capable of storing software 54 for reading said secondary images 52.

The generation software 46 is capable of generating one or more matrix codes 12 from data stored in the memory, the generated matrix codes 12 preferably complying with the ISO/IEC 18004 standard. In other words, the generation software 46 is capable of encoding said data into one or more corresponding QR codes.

In addition, the generation software 46 is capable of selecting the most suitable type of matrix code 12, notably according to the quantity of data to be encoded in the form of matrix codes 12. The type of matrix code 12, i.e. the symbol version within the meaning of the ISO/IEC 18004 standard, is additionally also determined according to the desired correction level. The higher the correction level, the lower the quantity of data that the matrix code 12 will contain for the same symbol version, i.e. for the same type of matrix code. When the matrix code 12 is intended to be displayed on a screen, the correction level is generally lower than that used in the case where the matrix code is printed on a label.

The partitioning software 48 is capable of determining the number N of secondary images 52 necessary for each matrix code 12, the number N of secondary images 52 per matrix code 12 being a function of the resolution of the screen 14A, 14B of the corresponding display device and the dimensions of said matrix code 12. The partitioning software 48 is then capable of partitioning the primary image 50 corresponding to a given matrix code 12 into the plurality of secondary images 52, said matrix code being intended to be displayed in the form of said secondary images 52 on the screen 14A, 14B and the secondary images 52 being displayed successively on the screen 14A, 14B.

The reading software 54 is capable of reading the secondary images 52 displayed on the screen 14A, 14B, i.e. of decoding the information contained in these secondary images 52 and storing the decoded information in the fourth memory 40. In addition, the reading software 54 is capable of reading the matrix codes 12 also.

Figure 2:
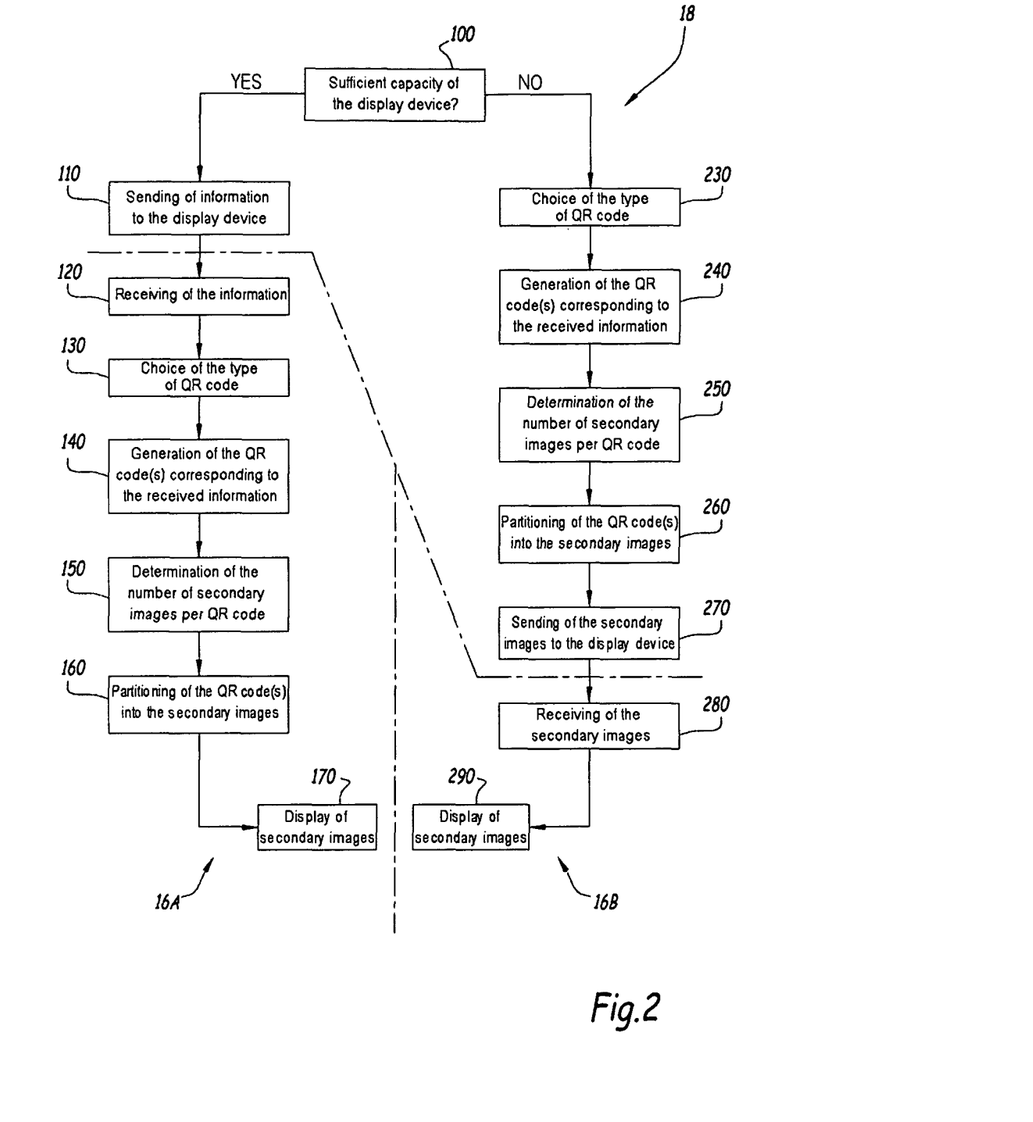
FIG. 2 is a functional flow diagram of a display method according to the invention, comprising generating a matrix code from the data to be sent, partitioning a primary image corresponding to the matrix code into a plurality of secondary images and displaying the matrix code in the form of the secondary images.

The operation of the display system 10 according to the invention will be described in more detail with reference to FIG. 2, showing a functional flow diagram of the display method according to the invention.

During the initial step 100, the remote device 18 determines, via its determination software 52, whether or not the capacity of the display device 16A, 16B which is intended to receive the next data to be sent to the equipment 22 (through display of secondary images 52) is sufficient for generating the corresponding matrix code(s) 12 and for partitioning the primary image(s) 50 into secondary images 52.

The resolution of the screen 14A, 14B of the display device is specific to each display device 16A, 16B and is supplied by each display device 16A, 16B to the remote device 18 during preliminary data exchanges between the remote device 18 and each display device 16A, 16B.

Alternatively, a parameterization file is stored in the memory 34 of the remote device 18 prior to the initial step 100, the parameterization file containing a unique identifier for each display device 16A, 16B and, for each identifier, the value of the resolution of the screen of the corresponding display device 16A, 16B.

If the capacity of the display device 16A is sufficient, as in the case of the first display device 16A in the example embodiment shown in FIG. 1, the remote device 18 then sends to the corresponding display device 16A, during step 110, using its transmission software 50, the data to be sent to the equipment 22 in the form of secondary images 52 corresponding to one or more matrix codes 12.

The display device, for example the first display device 16A, receives said data to be sent to the equipment 22 during step 120, using its reception software 44.

During step 130, the first display device 16A then selects the most suitable type of matrix code 12 using the generation software 46, notably depending on the quantity of said data to be sent to the equipment 22. By way of example, the quantity of data to be sent is 3 kilobytes (kB) and the first display device 16A will then choose, for example, a version 39 QR code comprising 157×157 modules, each being 3×3 pixels in size, i.e. a QR code of 471×471 pixels. The QR code 12 is generated during the following step 140 by the first display device 16A, again using the generation software 46. The generation of the QR code 12 carried out during step 140 is known per se.

During step 150, using the partitioning software 48, the first display device 16A then determines the number of secondary images 52 necessary for each QR code 12.

The number N of secondary images 52 for each QR code 12 is a function of the resolution of the screen 14A of the display device and the dimensions of said QR code 12. The number N of secondary images 52 for each QR code 12 verifies the following equation:

$$N = Nx \times Ny \quad (1)$$

where Nx represents the number of secondary images 52 in the horizontal direction X and Ny represents the number of secondary images 52 in the vertical direction Y.

The number Nx of secondary images 52 in the horizontal direction X verifies, for example, the following equation:

$$Nx = \begin{cases} E\left(\dfrac{L1x}{L2x}\right), & si \dfrac{L1x}{L2x} - E\left(\dfrac{L1x}{L2x}\right) = 0 \\ E\left(\dfrac{L1x}{L2x}\right) + 1, & si \dfrac{L1x}{L2x} - E\left(\dfrac{L1x}{L2x}\right) > 0 \end{cases} \quad (2)$$

where L1x represents the dimension of the QR code 12 in the horizontal direction X and L2x represents the dimension of the resolution of the screen 14A in the horizontal direction X, and E denotes the integer part in the mathematical sense.

The number Ny of secondary images in the vertical direction Y verifies, for example, the following equation:

$$Ny = \begin{cases} E\left(\dfrac{L1y}{L2y}\right), & si \dfrac{L1y}{L2y} - E\left(\dfrac{L1y}{L2y}\right) = 0 \\ E\left(\dfrac{L1y}{L2y}\right) + 1, & si \dfrac{L1y}{L2y} - E\left(\dfrac{L1y}{L2y}\right) > 0 \end{cases} \quad (3)$$

where L1y represents the dimension of the QR code 12 in the vertical direction Y and L2y represents the dimension of the resolution of the screen 14A in the vertical direction Y, and E denotes the integer part.

By way of example, the resolution of the screen 14A of the first device is 240 pixels in the horizontal direction X and 160 pixels in the vertical direction Y. In other words, L2x is equal to 240 and L2y is equal to 160. With the aforementioned QR code of 471×471 pixels, i.e. having L1x and L1y both equal to 471, Nx is then equal to 2 according to equation (2) and Ny is equal to 3 according to equation this (3). In this example, the number N of secondary images is therefore equal to 6.

During step 160, using the partitioning software 48, the primary image 50 corresponding to the QR code 12 is then partitioned into the plurality of secondary images 52 according to the numbers Nx and Ny of secondary images 52 in the horizontal direction X and in the vertical direction Y respectively.

Figure 5:
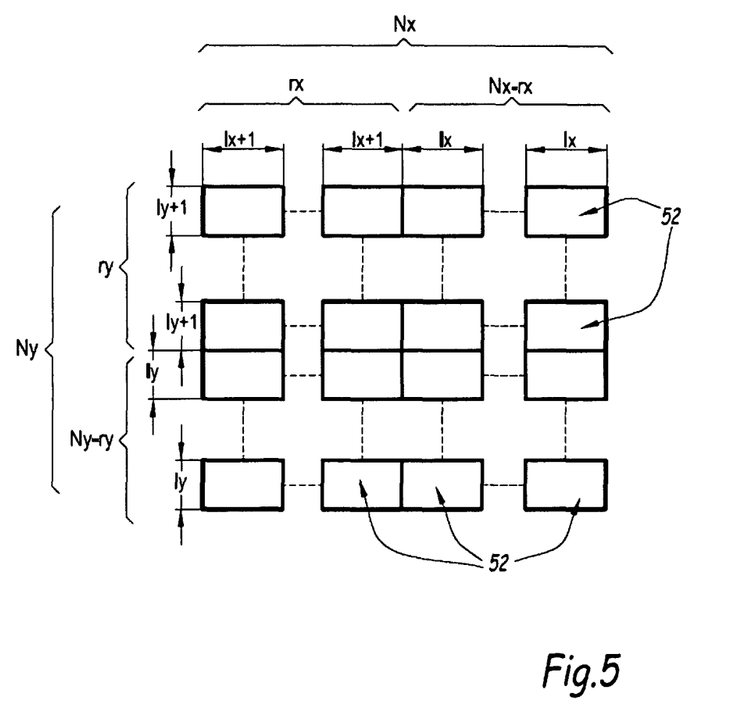
FIG. 5 is a schematic representation showing the calculation of the size of the secondary images.

By way of example, the size of the secondary images 52 is calculated in the following manner.

The parameters lx, ly and rx, ry are defined as verifying the following equalities:

$$lx = E\left(\dfrac{L1x}{Nx}\right) \quad (4)$$

$$ly = E\left(\dfrac{L1y}{Ny}\right) \quad (5)$$

$$rx = L1x - Nx \times lx \quad (6)$$

$$ry = L1y - Ny \times ly \quad (7)$$

On a horizontal line of secondary images, Nx−rx secondary images 52 will then be chosen with a dimension in the horizontal direction X equal to lx, and rx other secondary images 52 will be chosen with a dimension in the horizontal direction X equal to lx+1, as shown in FIG. 5.

On a vertical column of secondary images, Ny−ry secondary images 52 will then be chosen with a dimension in the vertical direction Y equal to ly, and ry other secondary images 52 will be chosen with a dimension in the vertical direction Y equal to ly+1, as shown in FIG. 5.

In addition (not shown), during step 160 and following the partitioning of the primary image 50 into a plurality of pieces, the pieces are each surrounded by a frame in order to generate the secondary images 52. In other words, each secondary image 52 then comprises a piece of the primary image 50, surrounded by said frame. The frame is, for example, in the form of a black line, or in the form of a group of lines containing encoded information, the encoded information then simplifying the subsequent decoding of the data sent via said secondary images 52.

When each secondary image 52 comprises the frame surrounding the piece of the primary image 50, ep denotes the thickness of the frame, and the number Nx of secondary images 52 in the horizontal direction X then verifies, for example, the following equation:

$$Nx = \begin{cases} E\left(\dfrac{L1x}{L2x - 2 \times ep}\right), & si \dfrac{L1x}{L2x - 2 \times ep} - E\left(\dfrac{L1x}{L2x - 2 \times ep}\right) = 0 \\ E\left(\dfrac{L1x}{L2x - 2 \times ep}\right) + 1, & si \dfrac{L1x}{L2x - 2 \times ep} - E\left(\dfrac{L1x}{L2x - 2 \times ep}\right) > 0 \end{cases} \quad (8)$$

where ep furthermore represents the thickness of the frame in relation to the quantities previously defined for equation (2).

The number Ny of secondary images in the vertical direction Y verifies, for example, the following equation:

$$Ny = \begin{cases} E\left(\dfrac{L1y}{L2y - 2 \times ep}\right), & si \dfrac{L1y}{L2y - 2 \times ep} - E\left(\dfrac{L1y}{L2y - 2 \times ep}\right) = 0 \\ E\left(\dfrac{L1y}{L2y - 2 \times ep}\right) + 1, & si \dfrac{L1y}{L2y - 2 \times ep} - E\left(\dfrac{L1y}{L2y - 2 \times ep}\right) > 0 \end{cases} \quad (9)$$

where ep furthermore represents the thickness of the frame in relation to the quantities previously defined for equation (3).

The number N of secondary images 52 for each QR code 12 also verifies equation (1):

The parameters lx, ly and rx, ry are defined as verifying the following equalities:

$$lx = E\left(\dfrac{L1x}{Nx}\right) \quad (10)$$

-continued $$ly = E\left(\frac{L1y}{Ny}\right) \quad (11)$$

$$rx = L1x - Nx \times lx \quad (12)$$

$$ry = L1y - Ny \times ly \quad (13)$$

According to this complement, the size of the secondary images 52 is calculated as follows. Nx–rx secondary images 52 will then be chosen with a dimension in the horizontal direction X equal to lx+(2*ep), and rx other secondary images 52 will be chosen with a dimension in the horizontal direction X equal to lx$_+$(2*ep)+1. Ny–ry secondary images 52 will then be chosen with a dimension in the vertical direction Y equal to ly+(2*ep), and ry other secondary images 52 will be chosen with a dimension in the vertical direction Y equal to ly$_+$(2*ep)+1.

Finally, during step 170, the secondary images 52 thus obtained are displayed successively on the screen 14A of the first display device using the display software 42, these secondary images 52 being intended to be read by the electronic equipment 22 using its reading unit 54.

If, during the initial step 100, the capacity of the display device 16A is not sufficient, as in the case of the second display device 16B in the embodiment shown in FIG. 1, the remote device 18 itself successively carries out step 230 of selecting the type of matrix code 12, step 240 of generating the matrix code(s) 12, step 250 of determining the number N of secondary images 52 and step 260 of partitioning the primary image 50 corresponding to each matrix code 12 into the plurality of secondary images 52.

The selection step 230 and the generation step 240, carried out using the generation software 46, are identical to steps 130 and 140 previously described and are not described again. Similarly, the determination step 250 and the partitioning step 260, carried out using the partitioning software 48, are identical to steps 150 and 160 previously described and are not described again.

Assuming, by way of example, that the resolution of the screen 14B of the second device is 150 pixels in the horizontal direction X and 100 pixels in the vertical direction Y, the QR code of 471×471 pixels yields a number Nx equal to 4 according to equation (2) and a number Ny equal to 5 according to equation (3). In this example, the number N of secondary images 52 is therefore equal to 20 for the screen 14B of the second device.

At the end of the partitioning step 260, the remote device 18 sends the secondary images 52 to the corresponding display device, for example to the second display device 16B, using its transmission software 50.

During step 280, the second display device 16B, using its reception software 44, then receives the secondary images 52 sent by the remote device 18 and displays them during step 290 on its screen 14B using its display software 42.

The display system 10 and the display method according to the invention therefore enable the display of the matrix codes 12 to be adapted to the resolution of the screens 14A, 14B of the different display devices 16A, 16B, this resolution being likely to vary from one display device 16A to the other 16B. In fact, according to the invention, the primary images 50 corresponding to the matrix code 12 are partitioned into secondary images 52 displayable on the screens 14A, 14B, the dimensions of each secondary image 52 being less than or equal to the resolution of the screens 14A, 14B of the corresponding display device. The number N of secondary images 52 thus varies according to the resolution of the screen 14A, 14B and the lower the resolution of the screen 14A, 14B, the higher the number N of secondary images 52 will be.

The display system 10 and the display method according to the invention also enable the transmission of the data to the equipment 22 to be speeded up in comparison with the display method of the prior art where the primary image 50 corresponding to the QR code 12 is displayed directly on the screen 14A, 14B without previously being partitioned into secondary images 52.

In fact, by way of example, with the resolution of the screen 14A of the first device of 240 pixels in the horizontal direction X and 160 pixels in the vertical direction Y, the type of QR code 12 displayable directly on this screen would be a version 5 QR code comprising 37×37 modules, each being 4×4 pixels in size, i.e. a QR code of 148×148 pixels. A QR code of this type enables 154 bytes to be encoded, and with the display method of the prior art, it would therefore be necessary to display 20 QR codes of this type successively on the screen 14A of the first device in order to send 3 kB of data. With the screen 14A of the first device, the 3 kB of data are sent via the display of only 6 secondary images 52 according to the display method according to the invention. In other words, in this example, the transmission of the data to the equipment 22 is around 3.3 times faster with the display method according to the invention than with the display method of the prior art.

It is thus clear that the display system 10 and the display method according to the invention enable optimization, depending on the resolution of the screen 14A, 14B, of the quantity of data sent to the equipment 22 via the display of the matrix code 12 in the form of secondary images 52, these secondary images 52 resulting from the partitioning of the primary image 50 corresponding to the matrix code 12.

The invention claimed is:

1. A method for displaying at least one matrix code on a screen of an electronic display device for sending data to electronic equipment including a reading unit for reading the matrix code, the display device comprising the screen and a display unit for displaying information on the screen, the method comprising:
generating at least one two-dimensional matrix code from the data to be sent;
displaying the matrix code on the screen, matrix codes being displayed successively when a plurality of matrix codes are generated; and
partitioning a primary image corresponding to a generated matrix code into at least two secondary images, dimensions of the primary image being equal to dimensions of the matrix code and dimensions of each secondary image being less than or equal to resolution of the screen of the display device,
corresponding matrix codes being displayed in a form of the secondary images during the displaying and the secondary images being displayed successively on the screen,
wherein the resolution of the screen and the matrix code each have a dimension in a horizontal direction and a number Nx of secondary images in the horizontal direction verifies following equation:

$$Nx = \begin{cases} E\left(\frac{L1x}{L2x}\right), & si\frac{L1x}{L2x} - E\left(\frac{L1x}{L2x}\right) = 0 \\ E\left(\frac{L1x}{L2x}\right) + 1, & si\frac{L1x}{L2x} - E\left(\frac{L1x}{L2x}\right) > 0 \end{cases},$$

wherein L1x represents dimension of the matrix code in the horizontal direction and L2x represents dimension of the resolution of the screen in the horizontal direction, and E denotes the integer part.

2. The method according to claim 1, wherein a number N of secondary images for each matrix code is a function of the resolution of the screen of the display device and the dimensions of the matrix code.

3. The method according to claim 1, wherein the resolution of the screen and the matrix code each have a dimension in a vertical direction and a number Ny of secondary images in the vertical direction verifies following equation:

$$Ny = \begin{cases} E\left(\dfrac{L1y}{L2y}\right), & si\dfrac{L1y}{L2y} - E\left(\dfrac{L1y}{L2y}\right) = 0 \\ E\left(\dfrac{L1y}{L2y}\right)+1, & si\dfrac{L1y}{L2y} - E\left(\dfrac{L1y}{L2y}\right) > 0 \end{cases}$$

wherein L1y represents dimension of the matrix code in the vertical direction and L2y represents dimension of the resolution of the screen in the vertical direction, and E denotes the integer part.

4. The method according to claim 3, wherein the number N of secondary images for each matrix code verifies the following equation:

N=Nx×Ny.

5. The method according to claim 1, wherein each matrix code complies with the ISO/IEC 18004 standard.

6. The method according to claim 1, wherein the data to be sent is received from a remote electronic device, different from the display device and connected to the display device via a data link.

7. The method according to claim 6, wherein the remote electronic device comprises a generation unit generating at least one two-dimensional matrix code from the data to be sent and a partitioning unit partitioning a primary image corresponding to a generated matrix code into at least two secondary images, and wherein the generating and the partitioning are carried out by the generation unit and by the partitioning unit respectively.

8. The method according to claim 1, wherein, during the partitioning, the primary image is partitioned into a plurality of pieces and the pieces are each surrounded by a frame, each secondary image then comprising a corresponding piece of the primary image, surrounded by the frame.

9. The method according to claim 8, wherein each frame is in a form of a group of lines containing encoded information.

10. A system for displaying at least one matrix code on a screen to send data to electronic equipment including a reading unit for reading the matrix code, the system comprising:
at least one electronic display device comprising the screen and a display unit displaying information on the screen;
a generation unit generating at least one two-dimensional matrix code from the data to be sent;
the display unit configured to display the matrix code on the screen, matrix codes being displayed successively when a plurality of matrix codes are generated;
wherein the system further comprises a partitioning unit partitioning a primary image corresponding to a generated matrix code into at least two secondary images, dimensions of the primary image being equal to dimensions of the matrix code and dimensions of each secondary image being less than or equal to resolution of the screen of the corresponding display device;
corresponding matrix codes being displayed in a form of the secondary images by the display unit and the secondary images being displayed successively on the corresponding screen,
wherein the resolution of the screen and the matrix code each have a dimension in a horizontal direction and a number Nx of secondary images in the horizontal direction verifies following equation:

$$Nx = \begin{cases} E\left(\dfrac{L1x}{L2x}\right), & si\dfrac{L1x}{L2x} - E\left(\dfrac{L1x}{L2x}\right) = 0 \\ E\left(\dfrac{L1x}{L2x}\right)+1, & si\dfrac{L1x}{L2x} - E\left(\dfrac{L1x}{L2x}\right) > 0 \end{cases},$$

wherein L1x represents dimension of the matrix code in the horizontal direction and L2x represents dimension of the resolution of the screen in the horizontal direction, and E denotes the integer part.

11. The system according to claim 10, further comprising a remote electronic device, distinct from the display device and connected to each display device via a data link, the electronic device comprising a memory for storing the data to be sent, the data to be sent being received by the generation unit from the storage memory.

12. A method for displaying at least one matrix code on a screen of an electronic display device for sending data to electronic equipment including a reading unit for reading the matrix code, the display device comprising the screen and a display unit for displaying information on the screen,
the method comprising:
generating at least one two-dimensional matrix code from the data to be sent;
displaying the matrix code on the screen, matrix codes being displayed successively when a plurality of matrix codes are generated; and
partitioning a primary image corresponding to a generated matrix code into at least two secondary images, dimensions of the primary image being equal to dimensions of the matrix code and dimensions of each secondary image being less than or equal to resolution of the screen of the display device, corresponding matrix codes being displayed in a form of the secondary images during the displaying and the secondary images being displayed successively on the screen,
wherein the resolution of the screen and the matrix code each have a dimension in a vertical direction and a number Ny of secondary images in the vertical direction verifies following equation:

$$Ny = \begin{cases} E\left(\dfrac{L1y}{L2y}\right), & si\dfrac{L1y}{L2y} - E\left(\dfrac{L1y}{L2y}\right) = 0 \\ E\left(\dfrac{L1y}{L2y}\right)+1, & si\dfrac{L1y}{L2y} - E\left(\dfrac{L1y}{L2y}\right) > 0 \end{cases}$$

wherein L1y represents dimension of the matrix code in the vertical direction and L2y represents dimension of the resolution of the screen in the vertical direction, and E denotes the integer part.

13. A system for displaying at least one matrix code on a screen to send data to electronic equipment including a reading unit for reading the matrix code, the system comprising:

at least one electronic display device comprising the screen and a display unit displaying information on the screen;
a generation unit generating at least one two-dimensional matrix code from the data to be sent;
the display unit configured to display the matrix code on the screen, matrix codes being displayed successively when a plurality of matrix codes are generated;
wherein the system further comprises a partitioning unit partitioning a primary image corresponding to a generated matrix code into at least two secondary images, dimensions of the primary image being equal to dimensions of the matrix code and dimensions of each secondary image being less than or equal to resolution of the screen of the corresponding display device,
corresponding matrix codes being displayed in a form of the secondary images by the display unit and the secondary images being displayed successively on the corresponding screen,
wherein the resolution of the screen and the matrix code each have a dimension in a vertical direction and a number Ny of secondary images in the vertical direction verifies following equation:

$$Ny = \begin{cases} E\left(\frac{L1y}{L2y}\right), & si\frac{L1y}{L2y} - E\left(\frac{L1y}{L2y}\right) = 0 \\ E\left(\frac{L1y}{L2y}\right) + 1, & si\frac{L1y}{L2y} - E\left(\frac{L1y}{L2y}\right) > 0 \end{cases}$$

wherein L1y represents dimension of the matrix code in the vertical direction and L2y represents dimension of the resolution of the screen in the vertical direction, and E denotes the integer part.

* * * * *